United States Patent
Carver et al.

(10) Patent No.: US 8,403,344 B2
(45) Date of Patent: Mar. 26, 2013

(54) DOLLY

(75) Inventors: Andrew Carver, Crook (GB); Peter Maple, Chackmore (GB)

(73) Assignee: DS Smith Plastics Limited, Maidenhead (GB)

( * ) Notice: Subject to any disclaimer, the term of this patent is extended or adjusted under 35 U.S.C. 154(b) by 355 days.

(21) Appl. No.: 12/406,580

(22) Filed: Mar. 18, 2009

(65) Prior Publication Data

US 2009/0236809 A1  Sep. 24, 2009

(30) Foreign Application Priority Data

Mar. 19, 2008  (GB) .................................. 0805114.6

(51) Int. Cl.
 *B62B 3/00* (2006.01)
(52) U.S. Cl. ........................................ 280/79.11; 280/30
(58) Field of Classification Search .................. 280/43, 280/43.12, 43.14, 79.11
 See application file for complete search history.

(56) References Cited

U.S. PATENT DOCUMENTS

| | | | | |
|---|---|---|---|---|
| 896,050 A | * | 8/1908 | Zwemer | 280/43.14 |
| 1,508,183 A | | 9/1924 | Hallowell | |
| 2,192,337 A | * | 3/1940 | Tiffany | 280/43.14 |
| 2,262,288 A | * | 11/1941 | Klipstein et al. | 188/152 |
| 2,444,184 A | | 6/1948 | Cahners | |
| 2,479,728 A | | 8/1949 | Graeme | |
| 2,628,068 A | | 2/1953 | Sehnert | |
| 2,655,387 A | * | 10/1953 | Cramer | 280/43.14 |
| 2,671,242 A | * | 3/1954 | Lewis | 16/33 |
| 2,814,498 A | | 11/1957 | Hull | |
| 2,843,392 A | * | 7/1958 | Simpkins | 280/43.14 |
| 2,922,494 A | | 1/1960 | Clark, Jr. | |
| 3,216,531 A | * | 11/1965 | Hutchinson | 188/5 |
| 3,217,839 A | | 11/1965 | Watkings et al. | |
| 3,247,931 A | * | 4/1966 | Bunn | 188/5 |
| 3,422,929 A | | 1/1969 | Oja et al. | |
| 3,710,895 A | | 1/1973 | Freedman | |
| 3,788,683 A | * | 1/1974 | Rumell | 410/66 |
| 3,804,211 A | | 4/1974 | Scherzinger | |
| 4,016,819 A | | 4/1977 | Cowling | |
| 4,073,369 A | | 2/1978 | Nordskog | |

(Continued)

FOREIGN PATENT DOCUMENTS

| | | |
|---|---|---|
| DE | 75 26 812 | 1/1972 |
| DE | 20 32 214 | 2/1972 |

(Continued)

*Primary Examiner* — Katy M Ebner
(74) *Attorney, Agent, or Firm* — Joseph A. Fuchs; The Chicago Technology Law Group, LLC (57) ABSTRACT

The present invention provides a dolly (10) having a deck (12) including a plurality of rotatable members (14) secured thereto to support the deck (12) relative to a support surface (16) and enable the dolly (10) to move on the support surface (16). Each rotatable member (14) has a skirt element (24) located adjacent thereto. The or each skirt element (24) is movable relative to the deck (12) between a first position in which each rotatable member (14) is exposed beyond the adjacent skirt element (24) to a first extent and a second position in which each rotatable member (14) is exposed beyond the adjacent skirt element (24) to a second extent. The second extent is less than the first extent. Movement of the or each skirt element (24) between the first and second positions selectively engages a brake (50) to inhibit movement of the dolly (10) relative to the support surface (16).

19 Claims, 6 Drawing Sheets

U.S. PATENT DOCUMENTS

| | | | | |
|---|---|---|---|---|
| 4,108,455 A * | | 8/1978 | James | 280/43.23 |
| 4,213,624 A | | 7/1980 | Sanders | |
| 4,313,612 A | | 2/1982 | Rubens | |
| 4,453,613 A * | | 6/1984 | Gebelius | 180/125 |
| 4,471,969 A | | 9/1984 | Zabala et al. | |
| 4,886,286 A | | 12/1989 | Whorton, III | |
| 5,193,828 A | | 3/1993 | Benvenuti | |
| 5,355,813 A | | 10/1994 | Darnell et al. | |
| 5,429,908 A | | 7/1995 | Hokuf et al. | |
| 5,551,715 A * | | 9/1996 | Pickard | 280/43.24 |
| 5,695,315 A * | | 12/1997 | Doi | 414/798.9 |
| 5,819,671 A | | 10/1998 | Ocampo | |
| 5,845,914 A | | 12/1998 | Lenkman | |
| 5,938,217 A | | 8/1999 | Trovato et al. | |
| 5,940,932 A * | | 8/1999 | LaHay | 16/30 |
| 2,387,777 A | | 9/1999 | Stanton et al. | |
| 6,843,625 B2 | | 1/2005 | Hewitt | |
| 7,104,553 B2 * | | 9/2006 | Gruber | 280/33.991 |
| 7,228,936 B2 * | | 6/2007 | Wyse et al. | 182/17 |
| 7,537,222 B2 * | | 5/2009 | Hadar | 280/43.12 |
| 2001/0040069 A1 | | 11/2001 | Trovato et al. | |
| 2003/0213878 A1 | | 11/2003 | Stahl | |
| 2003/0235488 A1 | | 12/2003 | Hadar | |
| 2004/0251646 A1* | | 12/2004 | Erbach | 280/43.12 |
| 2005/0002766 A1* | | 1/2005 | Hartmann et al. | 414/467 |
| 2005/0127620 A1 | | 6/2005 | Amundson | |
| 2005/0179235 A1 | | 8/2005 | Stewart et al. | |
| 2007/0057475 A1* | | 3/2007 | Hadar | 280/43.12 |

FOREIGN PATENT DOCUMENTS

| | | |
|---|---|---|
| DE | 23 64 909 | 7/1975 |
| DE | 24 32 111 | 1/1976 |
| DE | 44 03 659 | 8/1985 |
| DE | 196 02 572 | 7/1996 |
| DE | 198 09 331 | 5/1999 |
| EP | 0242 076 | 10/1987 |
| EP | 0395 518 | 4/1990 |
| EP | 0487 147 | 5/1992 |
| EP | 0 515 578 | 7/1992 |
| EP | 0666 208 | 1/1995 |
| EP | 0 666 209 | 8/1995 |
| EP | 0774 419 | 5/1997 |
| EP | 0812 947 | 12/1997 |
| EP | 1 176 079 | 1/2002 |
| EP | 1 277 663 | 1/2003 |
| EP | 1 362 794 | 11/2003 |
| EP | 1 524 170 | 4/2005 |
| EP | 1 875 097 | 11/2006 |
| EP | 1 772 390 | 4/2007 |
| FR | 1 132 757 | 3/1957 |
| FR | 1 391 000 | 1/1965 |
| FR | 2 116 690 | 7/1972 |
| FR | 2 205 443 | 5/1974 |
| FR | 2 372 104 | 6/1978 |
| FR | 2 527 556 | 12/1983 |
| FR | 2 624 097 | 6/1989 |
| FR | 2 639 912 | 6/1990 |
| FR | 0 395 518 | 10/1990 |
| GB | 633 246 | 12/1949 |
| GB | 773 948 | 5/1957 |
| GB | 901 340 | 7/1962 |
| GB | 1232144 | 5/1971 |
| GB | 1 498 022 | 1/1978 |
| GB | 2 082 450 | 3/1982 |
| GB | 2 317 374 | 3/1998 |
| GB | 2 328 419 | 2/1999 |
| GB | 2 335 906 | 10/1999 |
| GB | 2 376 222 | 12/2002 |
| GB | 2 391 534 | 2/2004 |
| GB | 2 410 238 | 7/2005 |
| GB | 2 417 417 | 3/2006 |
| GB | 2 423 055 | 8/2006 |
| GB | 2 430 926 | 4/2007 |
| GB | 2 436 553 | 10/2007 |
| GB | 2 440 699 | 2/2008 |
| GB | 2 440 802 | 2/2008 |
| GB | 2 441 045 | 2/2008 |
| JP | 2000-238777 | 9/2000 |
| WO | WO 81/00392 | 2/1981 |
| WO | WO 2004/080780 | 9/2004 |
| WO | WO 2004/105733 | 12/2004 |
| WO | WO 2005/080214 | 9/2005 |
| WO | WO 2006/077600 | 7/2006 |
| WO | WO 2006/049694 | 11/2006 |
| WO | WO 2007/028194 | 3/2007 |
| WO | WO 2007/029231 | 3/2007 |
| WO | WO 2007/057475 | 3/2007 |
| WO | WO 2007/110651 | 10/2007 |
| WO | WO 2008/017798 | 2/2008 |
| ZA | 8902552 | 12/1989 |

* cited by examiner

DOLLY

RELATED APPLICATION

The present application claims priority to GB 0805114.6 filed Mar. 19, 2008, which is incorporated in its entirety herein by reference and made a part hereof.

TECHNICAL FIELD

This invention relates to a dolly for use in particular, but not exclusively, for the storage, transportation and retail of goods.

SUMMARY OF THE INVENTION

A conventional dolly includes a deck to receive goods and rotatable members, e.g. castors, secured to the deck to support the deck relative to a support surface, such as a substantially smooth floor in a store or warehouse. The rotatable members enable the dolly to move on the support surface which allows a user to conveniently move goods held by the dolly from one location to another.

However, one problem with a conventional dolly is that it cannot be handled by automated conveying systems such as chain conveyors, power-driven roller conveys, or gravity-feed conveyors. This limits the usefulness of a dolly in a supply and distribution chain since it is necessary to transfer goods between a dolly and, e.g. a pallet, to permit automated conveying of the goods. Such transfers are time-consuming and labour intensive, and so introduce bottlenecks and inefficiencies into the supply and distribution chain.

Therefore there is a need for a dolly which permits a user to conveniently move goods from one location to another and is also handlable by an automated conveying system.

According to a first aspect of the invention there is provided a dolly comprising a deck including a plurality of rotatable members secured thereto to support the deck relative to a support surface and enable the dolly to move on the support surface, each rotatable member having a skirt element located adjacent thereto, the or each skirt element being movable relative to the deck between a first position in which each rotatable member is exposed beyond the adjacent skirt element to a first extent and a second position in which each rotatable member is exposed beyond the adjacent skirt element to a second extent, the second extent being less than the first extent, movement of the or each skirt element between the first and second positions selectively activating a brake to inhibit movement of the dolly relative to the support surface.

According to a second aspect of the invention there is provided a dolly comprising a deck including a plurality of rotatable members secured thereto to support the deck relative to a support surface and enable the dolly to move on the support surface, a first rotatable member protruding from the deck along a protrusion axis and having a first skirt element located adjacent thereto, the first skirt element being movable between first and second positions along a first path lying parallel to the first protrusion axis, the first skirt element being closer to the deck in the first position, movement of the first skirt element between the first and second positions selectively activating a brake to inhibit movement of the dolly relative to the support surface.

When the or each skirt member is in the first position the dolly adopts a conventional dolly-like configuration in which a user is able to move the dolly on a support surface. The rotatable members are in their most exposed condition, and so the dolly is able to accommodate imperfections in the support surface.

When the or each skirt member is in the second position the dolly adopts a pallet-like configuration in which the rotatable members adopt a less exposed condition, lie flush with the or each skirt member, or are recessed relative to the or each skirt member. In such a configuration the or each skirt element provides a degree of shielding to the rotatable members and thereby prevents fouling of the rotatable members on the conveyor elements of automated conveying systems. As a result such automated conveying systems are able to handle the dolly in this configuration.

Furthermore, selectively activating a brake by moving the or each skirt element between the first and second positions allows a user to inhibit movement of the dolly, as desired, when positioned as required in, e.g. a store location or a vehicle during transportation.

Preferably movement of the or each skirt element from the first position to the second position activates the brake to inhibit movement of the dolly relative to the support surface. Such an arrangement results in movement of the dolly being inhibited while the dolly is in a pallet-like configuration with its rotatable members in their least exposed condition. This results in the brake operating intuitively from a user's perspective since the user will appreciate that a pallet is normally more difficult to move than, e.g. a dolly.

In a preferred embodiment of the invention each rotatable member has a discrete skirt element associated therewith. This arrangement readily allows for the insertion of the tines of, e.g. a fork-lift truck, between the rotatable members and associated skirt element.

Optionally each discrete skirt element defines a sleeve extending around the corresponding rotatable member. The inclusion of such a sleeve provides a degree of protection to each rotatable member, and helps to ensure that the dolly, when in its pallet-like configuration, can be handled by automated conveying systems in a variety of differing orientations.

In another preferred embodiment of the invention at least two adjacent skirt elements are interconnected by a skid member. The inclusion of a skid member between adjacent skirt elements increases the rigidity of the skirt elements. It also defines an aperture between the skid member, the deck, and the adjacent skirt elements 24, which is able to receive and retain to a degree the tine of, e.g. a fork-lift truck, and so help to prevent tipping of the dolly off of the truck.

In a further preferred embodiment of the invention two pairs of adjacent skirt elements are interconnected by a skid member. Such an arrangement allows the dolly to receive and retain to a degree the tine of a lifting device from more than one direction.

Preferably the dolly further includes an actuator to move the or each skirt element between the first and second positions. This provides a user with a convenient way of transforming the dolly between its dolly-like and pallet-like configurations.

The brake may include a brake member coupled with a skirt element to engage with the support surface. This arrangement readily utilises movement of the or each skirt element to inhibit movement of the dolly, while continuing to isolate the or each skirt element from any loading generated by goods received on the deck.

Optionally the brake member is movable relative to the skirt element. This allows the brake member to accommodate any unevenness or irregularities in the support surface.

Preferably the brake member is biased relative to the skirt element so as to protrude relative thereto.

The brake member may be resiliently deformable.

The foregoing features allow the brake member to accommodate any irregularities in the support surface while imparting an increased braking force on the support surface.

In a preferred embodiment of the invention the brake member is or includes a rubber bung. Such an item is readily available.

Optionally the brake member is coupled with a skid member. This provides a convenient arrangement for moving the brake member into engagement with the support surface on movement of the or each skirt element towards the second position.

Conveniently the brake includes a plurality of brake members, each coupled with a skid member. This distributes the braking effect on the dolly, and so allows the dolly to accommodate irregularities in the support surface while ensuring movement of the dolly is inhibited.

In another preferred embodiment of the invention the brake includes a brake member coupled with a skirt element to engage an adjacent rotatable member. This arrangement readily utilises movement of the or each skirt element to inhibit movement of the dolly, while continuing to isolate the or each skirt element from any loading generated by goods received on the deck Preferably the brake member is annular. The inclusion of an annular brake member ensures that the brake member is engagable with a rotatable member regardless of its orientation.

The brake member may be resiliently deformable. Such a brake member accommodates any irregularities in the shape of the corresponding rotatable member.

Optionally the brake member is or includes rubber. Such a material has desirable performance characteristics.

In a further preferred embodiment of the invention two or more discrete skirt elements include a brake member coupled therewith. Such an arrangement provides increased breaking, and thereby further inhibits any movement of the dolly.

BRIEF DESCRIPTION OF THE DRAWINGS

There now follows a brief description of a preferred embodiment of the invention, by way of non-limiting example, with reference being made to the accompanying drawings, in which.

DETAILED DESCRIPTION OF THE INVENTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

A dolly according to a preferred embodiment of the invention is designated generally by the reference numeral 10.

The dolly 10 includes a deck 12 which has four rotatable members 14 secured thereto to support the deck 12 relative to a support surface 16 and enable the dolly 10 to move on the support surface 16. Each rotatable member 14 protrudes from the deck 12 along a respective protrusion axis $A_p$, and is a castor 18. In the embodiment shown each protrusion axis $A_p$ extends substantially perpendicular to the deck 12. Two of the castors 18 are fixed castors 20 and two of the castors 18 are swivel castors 22. Other embodiments of the invention may include a different number of rotatable members 14, and different rotatable members 14 such as wheels, rollers or balls. Moreover, in other embodiments of the invention (not shown) the various protrusion axes $A_p$ may not all lie parallel with one another.

Each rotatable member 14 has a skirt element 24 located adjacent thereto. In the embodiment shown, each rotatable member 14 has a discrete skirt element 24 associated therewith, and each discrete skirt element 24 defines a sleeve 26 that extends around the corresponding rotatable member 14. Other embodiments of the invention may include a different number or arrangement of skirt elements and/or sleeves. In addition, each sleeve 26 need not extend completely around the corresponding rotatable member 14.

First and second pairs 28, 30 of adjacent skirt elements 24 are interconnected by a skid member 32.

Each skirt element 24 is movable relative to the deck 12 between first and second positions.

Figure 3A:
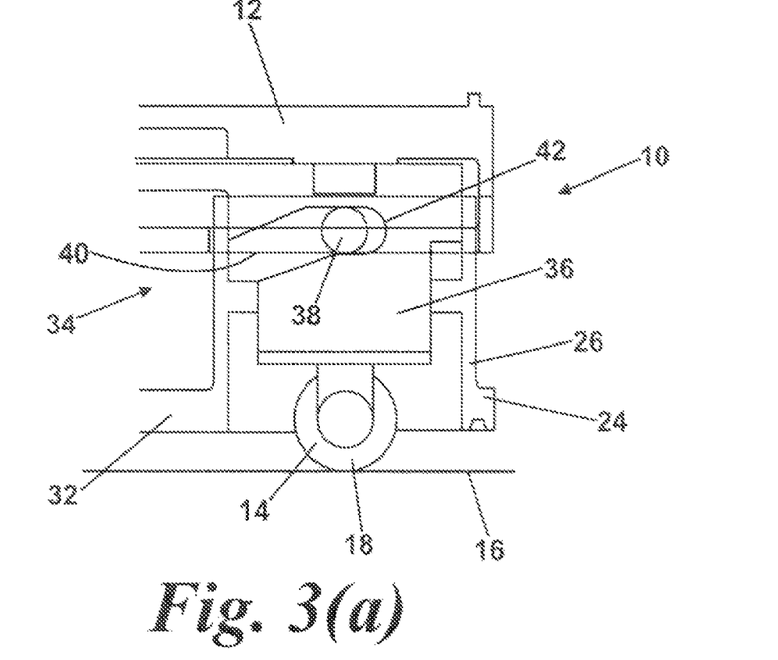
FIG. 3(a) shows a schematic, elevational view from a first side of a portion of the dolly shown in FIG. 1(a) in the first configuration.
Figure 3B:
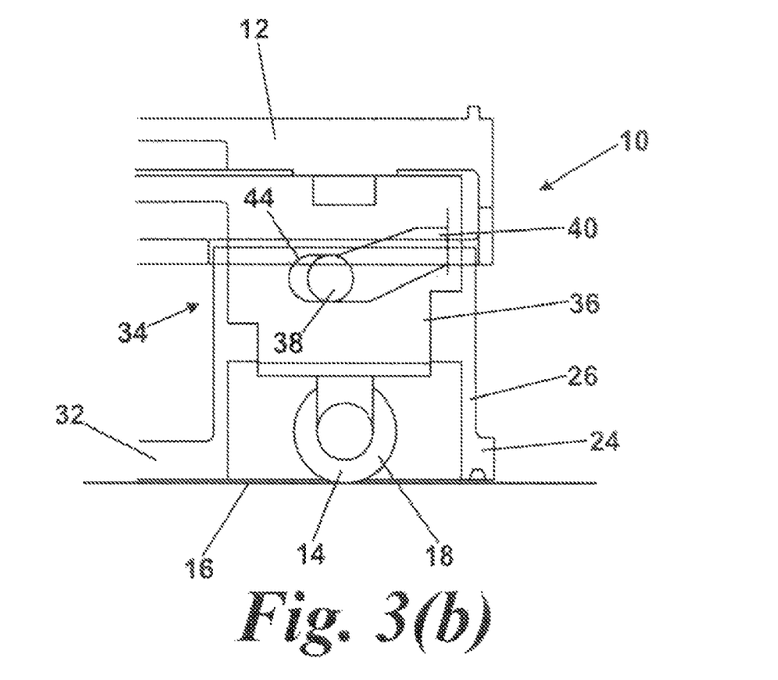
FIG. 3(b) shows a schematic, elevational view from a first side of a portion of the dolly shown in FIG. 1(a) in the second configuration.
Figure 4:
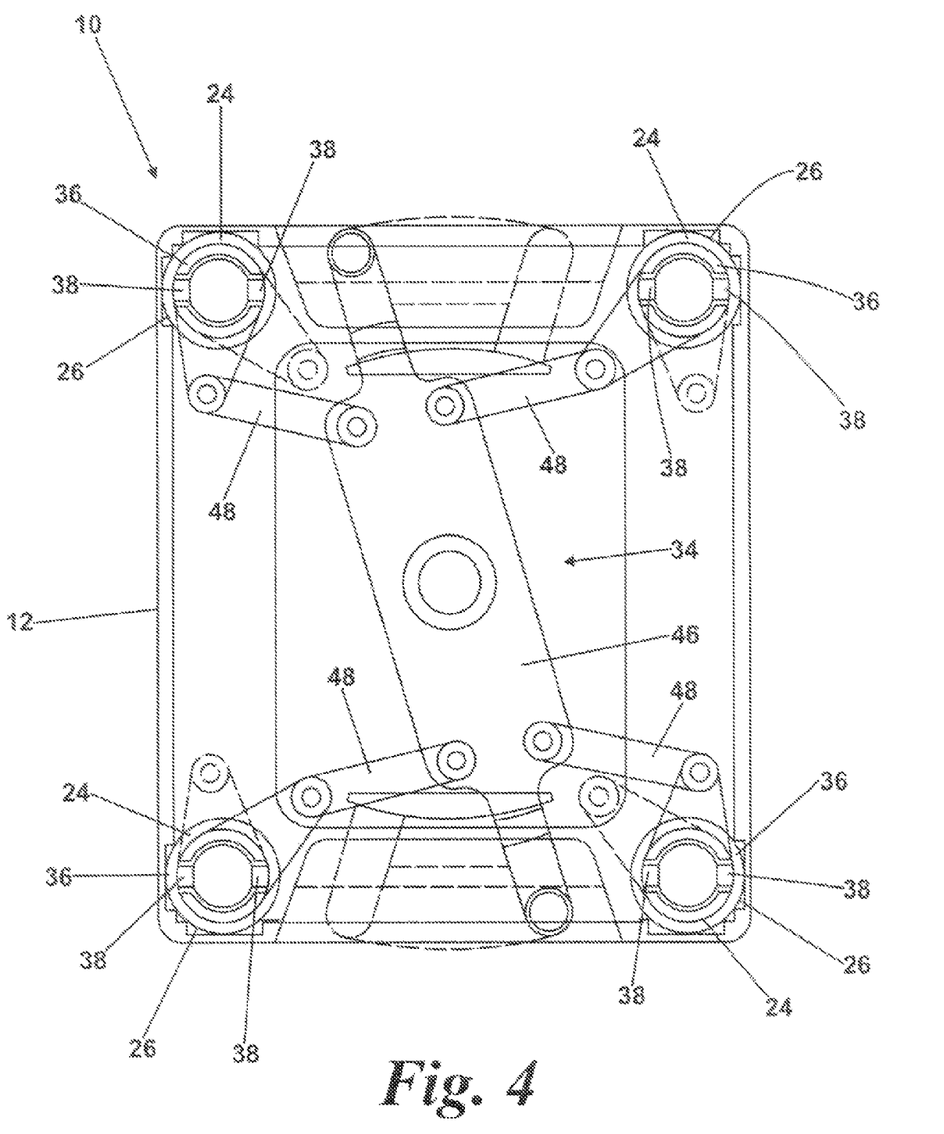
FIG. 4 shows a schematic, plan view from above of the dolly shown in FIG. 1(a)
Figure 5A:
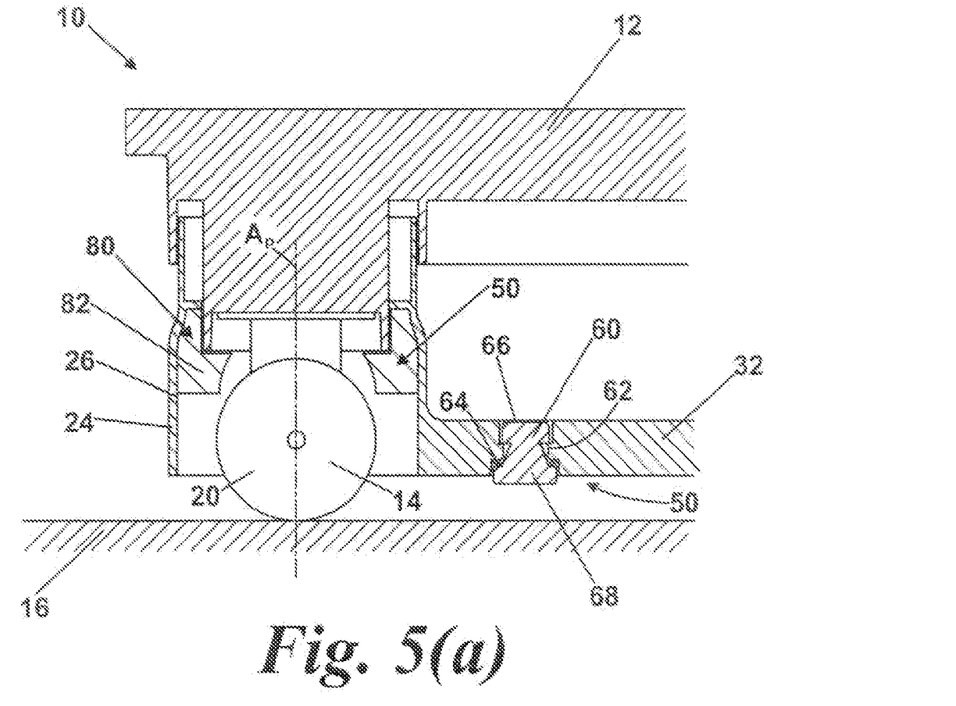
FIG. 5(a) shows a schematic, elevation view from a first side of a portion of the dolly shown in FIG. 1(a) in the first configuration.
Figure 5B:
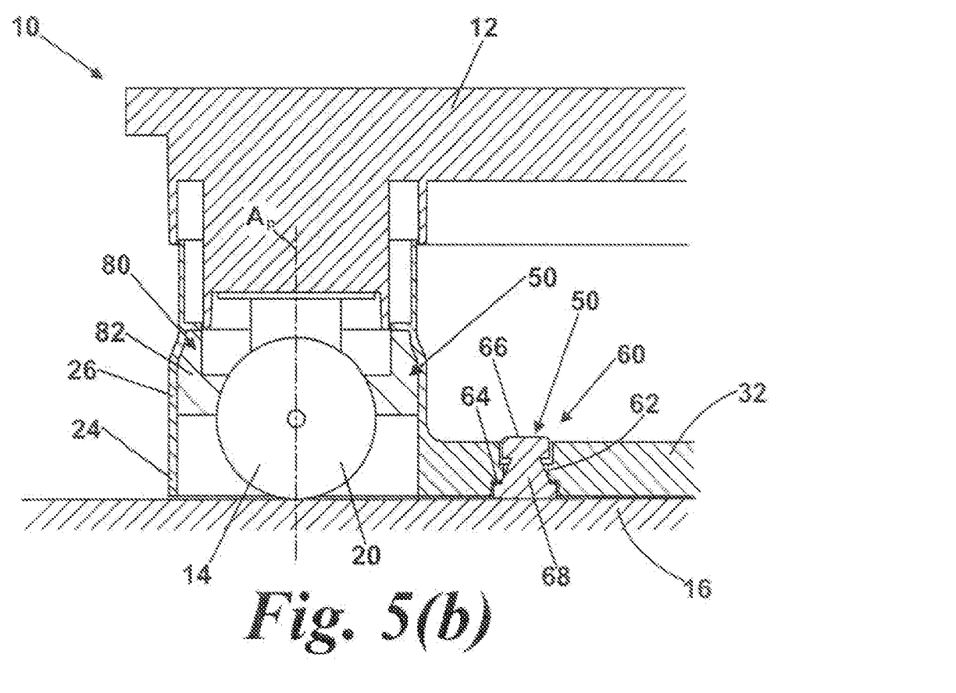
FIG. 5(b) shows a schematic, elevation view from a first side of the portion of the dolly shown in FIG. 5(a) in the second configuration.
Figure 6A:
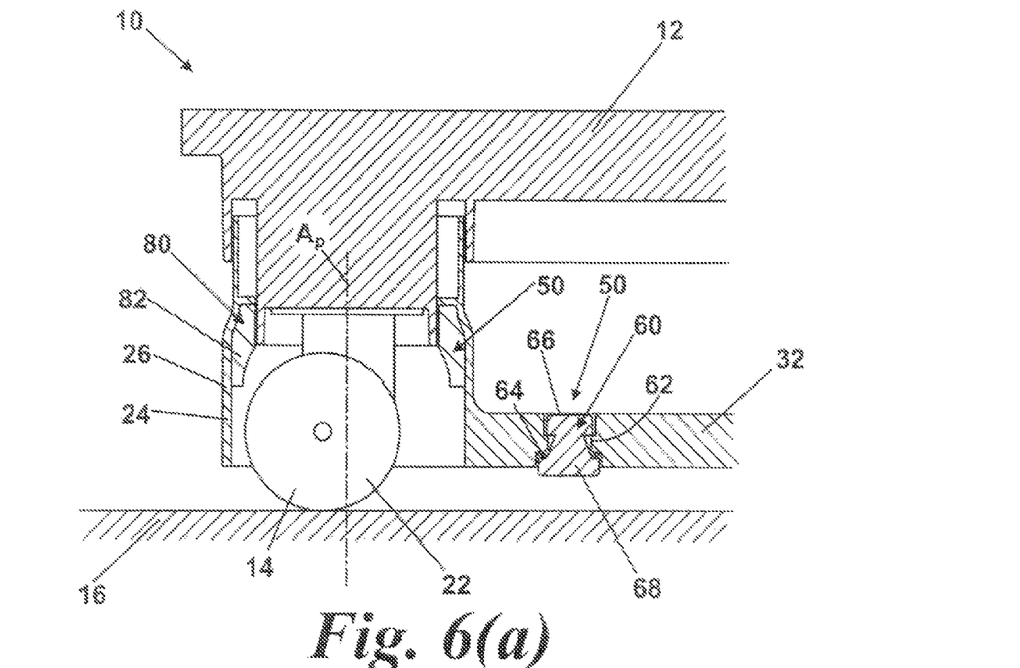
FIG. 6(a) shows a schematic, elevation view from a first side of a portion of the dolly shown in FIG. 1(a) in the first configuration.
Figure 6B:
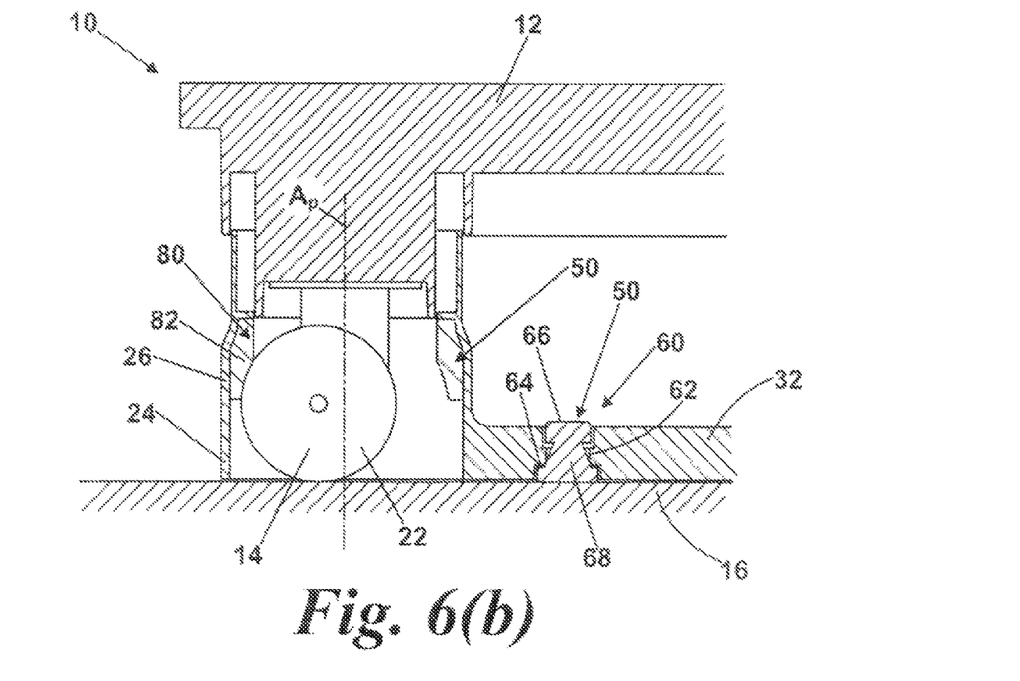
FIG. 6(b) shows a schematic, elevation view from a first side of the portion of the dolly shown in FIG. 6(a) in the second configuration.

In particular, in the embodiment shown, each skirt element 24 is movable relative to the deck 12 between a first position in which each rotatable member 14 is exposed beyond the adjacent skirt element 24 to a first extent, as shown in FIGS. 3(a), 5(a) and 6(a), and a second position in which each rotatable member 14 is exposed beyond the adjacent skirt element 24 to a second extent, as shown in FIGS. 3(b), 5(b) and 6(b). The second extent is less than the first extent.

The first extent typically ranges between 10 mm and 25 mm, while the second extent ranges between 0.2 mm and 2 mm. In an especially preferred embodiment of the invention the first extent is 18.6 mm, and the second extent is 0.2 mm.

When the or each skirt element 24 is in each of the first and second positions mentioned above, the rotatable members 14 remain exposed beyond the or each adjacent skirt element. This allows the mass of any goods received by the deck 12 to be transmitted directly to the support surface 16 by the rotatable members 14, and so provides the opportunity to isolate the or each skirt element 24 from any loading generated by goods received on the deck 12. Such isolation facilitates ready movement of the or each skirt element 34 between the first and second positions, and so allows a user readily to transform the dolly 10 between the dolly-like and pallet-like configurations mentioned above, without the need to overcome any load generated by goods received on the deck 12.

In other embodiments (not shown) the rotatable member 14 may lie flush with the skirt elements 24, or be recessed relative to the skirt elements 24, while the skirt elements 24 are in the second position.

As such the skirt elements 24 may be movable between first and second positions along a first path which lies parallel to a protrusion axis $A_p$, i.e. a first protrusion axis, of one rotatable member 14, i.e. a first rotatable member. In such circumstances the skirt elements 24 are closer to the deck 12 while in the first position.

Figure 2:
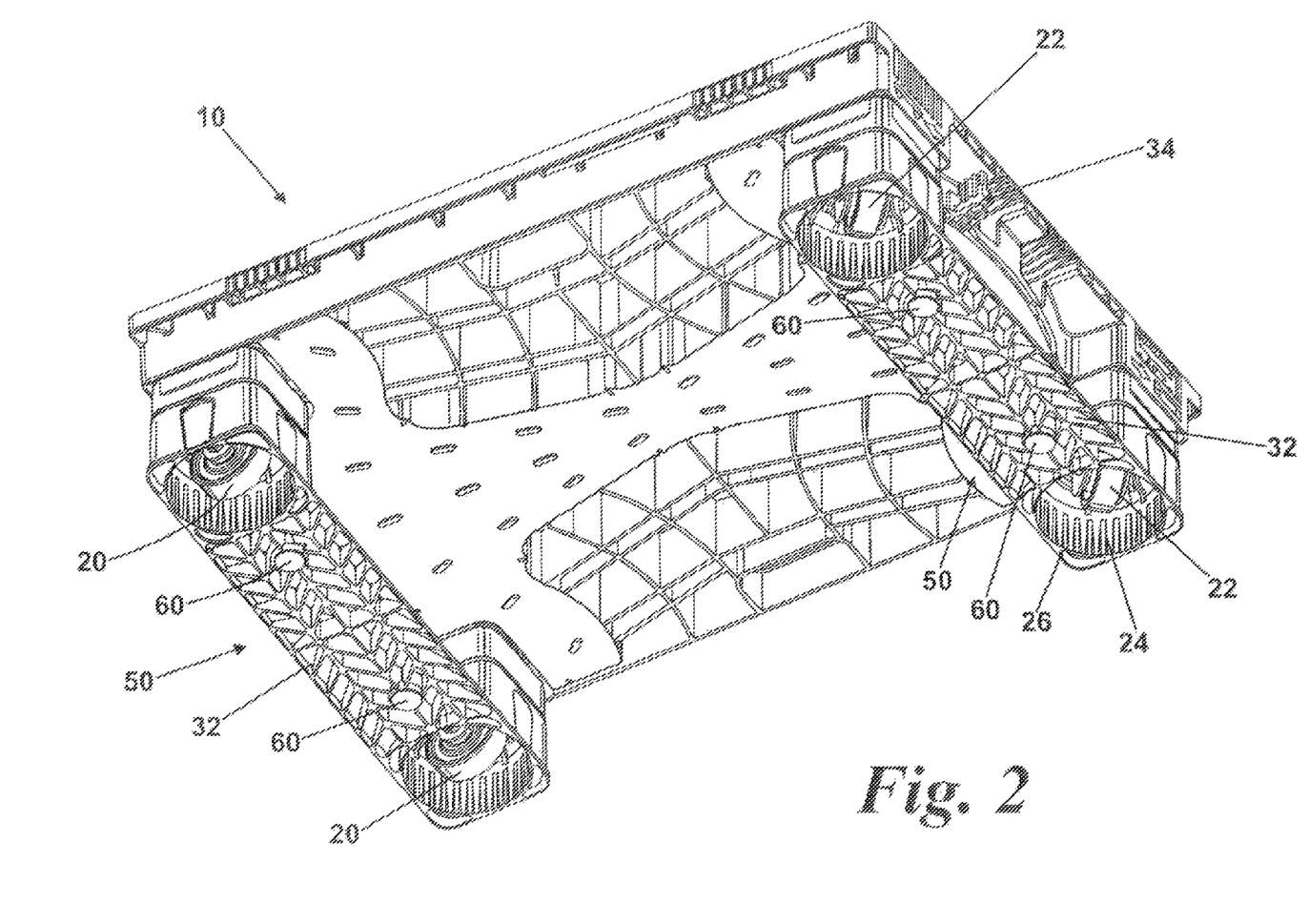
FIG. 2 shows a perspective view from below of the dolly shown in FIG. 1(a) in the second configuration.

The dolly 10 shown includes an actuator 34 to move the skirt elements 24 between the first and second positions and which, in the embodiment shown, is housed substantially within the deck 12, as shown in FIG. 2.

The actuator 34 includes four actuator members 36 each of which corresponds to a sleeve 26. Each actuator member 36 is rotatable relative to the corresponding sleeve 26 to move the skirt elements 24 between the first and second positions. Each sleeve 26 includes two spigots 38 and each actuation member 36 includes two profiled slots 40. The spigots 38 and the profiled slots 40 are mutually interengagable and cooperate to translate rotational movement of the actuation member 36 into linear movement of the sleeves 26 and corresponding skirt element 24. Each profiled slot 40 defines a first and second retaining portion 42, 44 to retain the skirt elements 24 in each of the first and second positions, respectively.

Other embodiments of the invention may include different interengagable members, arrangements and configurations.

As shown in FIG. 3, the actuator 34 includes a lever 46 which is pivotally connected to the deck 12 and pivotally connected with each actuation member 36. In the embodiment shown the lever 42 is pivotally connected to each actuation member 36 via a respective linkage 48 such that movement of the lever 42 causes each of the actuation members 36 to rotate in the same direction.

Movement of each skirt element 24 between the first and second positions selectively activates a brake 50 to inhibit movement of the dolly 10 relative to the support surface 16.

In the embodiment shown, movement of each skirt element 24 from the first position to the second position activates the brake 50 to inhibit movement of the dolly 10 relative to the support surface 16. In other embodiments of the invention (not shown) movement of the or each skirt element 24 from the second position to the first position may activate a brake to inhibit movement of the dolly.

The brake 50 may include a first brake member 60 which is coupled with a skirt element 24 so as to protrude relative to the skirt element 24. The first brake member 60 engages with the support surface 16 when the skirt element 24 is in the second position, as shown in FIGS. 5(b) and 6(b). Preferably the first brake member 60 is configured such that under the mass of the dolly 10 alone, when engaged with the support surface 16, it is exposed beyond the skirt element 24 to the same extent as the rotatable member 16, as shown in FIGS. 5(b) and 6(b).

In the embodiment shown the first brake member 60 is received within an aperture 62 lying in a skid member 32, and the dolly 10 includes four first brake members 60, two in each skid member 32, as shown in FIG. 2. Other embodiments of the invention may include a different number or arrangement of first brake members 60.

The first brake member 60 is resiliently biased within the aperture 62 by a washer 64, such as a spring washer. Other forms of resilient biasing, including springs, are also possible. In addition the first brake member 60 is itself resiliently deformable.

Figure 1A:
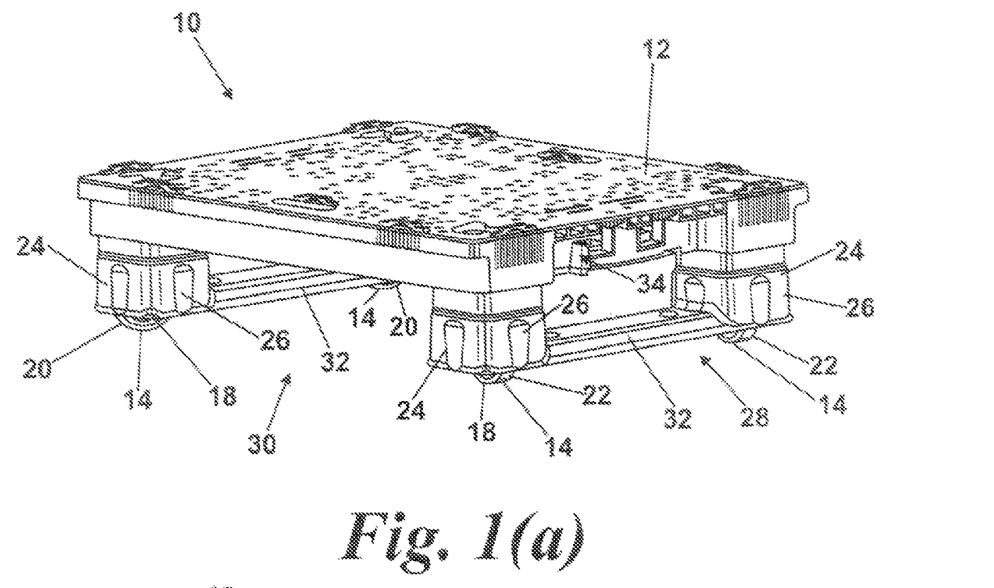
FIG. 1(a) shows a perspective view of a dolly according to a first embodiment of the invention in a first configuration.
Figure 1B:
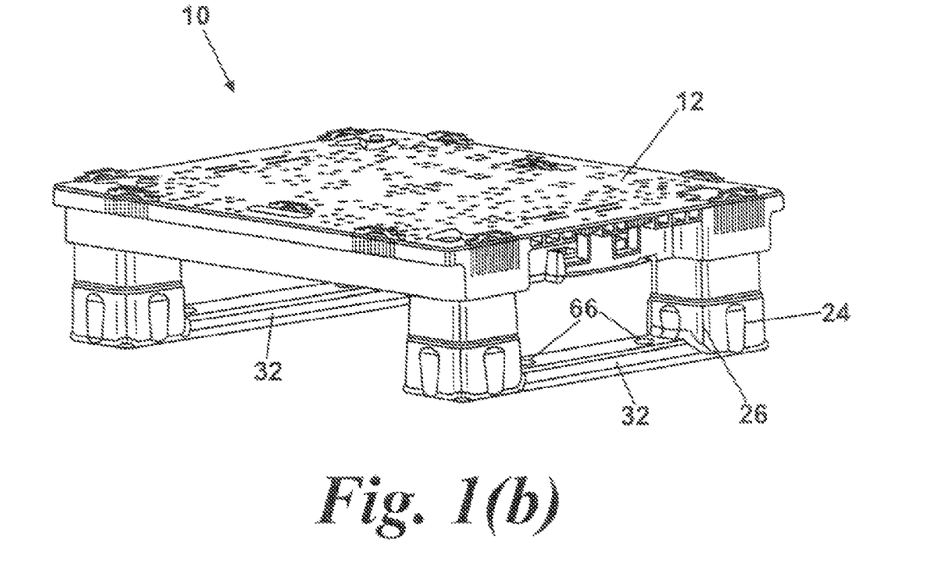
FIG. 1(b) shows a perspective view of the dolly shown in FIG. 1(a) in a second configuration.

As shown in FIGS. 1, 5 and 6 one end 66 of each first brake member 60 is visible from an, in-use, upper surface of the corresponding skid member 32. Accordingly the brake members may be colour-coded to indicate whether or not the brake 50 is engaged, and hence whether or not movement of the dolly 10 is inhibited.

For example, when the actuator 22 is in a position corresponding to the skirt elements 24 being in the second position and the first brake members 60 being engaged with the support surface 16 to inhibit movement of the dolly 10, a red first brake member 60 received in the aperture 62 aligned with the actuator 22 signifies "stop", i.e. no movement. Conversely the other aperture in the skid member 32 may receive a green first brake member 60 to signify "go", i.e. movement possible, when the actuator 22 is aligned with this first brake member 60.

Each of the first brake members 60 mentioned above is a rubber bung 68. The Shore hardness of the rubber bung is preferably in the range 50 to 80, and more especially in the range 60 to 65.

Alternatively, or as well, the brake 50 may include a second brake member 80 coupled with a skirt element 24 to engage an adjacent rotatable member 14 when the skirt element 24 is in the second position, as shown in FIGS. 5(b) and 6(b). One or more of the discrete skirt elements 24 may include a second brake member 80 coupled therewith.

In each of the embodiments shown the second brake member 80 is annular. This helps to ensure that the second brake member 80 engages with a swivel castor 22 irrespective of the orientation of the swivel castor 22, as shown in FIG. 6(b). Moreover, it allows the second brake member 80 to engage with a fixed castor 20 in two regions, as shown in FIG. 5(b), to help ensure suitable braking of the fixed castor 20. Furthermore, the provision of an annular second brake member 80 allows the use of the same second brake member 80 in each case, i.e. when braking a fixed castor 20 and when braking a swivel castor 22, thereby simplifying manufacture and assembly of the dolly 10.

In each embodiment the second brake member 80 is a resiliently deformable rubber ring 82. The Shore hardness of the rubber ring is preferably in the range 50 to 80, and more especially in the range 60 to 65.

In use of the dolly 10 a user operates the actuator 34 to move the skirt elements 24 into the first or second position, as desired.

With the skirt elements 24 in the first position the dolly 10 is able to adopt a conventional dolly-like configuration in which a user is able to move the dolly 10 on a support surface. The rotatable members 14 are in their most exposed condition, and so the dolly 10 is able to accommodate imperfections in the support surface 16.

With the skirt elements 24 in the second position the dolly 10 is able to adopt a pallet-like configuration in which the rotatable members 14 are less exposed, lie flush with the skirt elements 24, or are recessed relative to the skirt elements 24. In such a configuration the skirt elements 24 provide a degree of shielding to the associated rotatable member 14. This reduces the likelihood of any fouling of the rotatable members 14 on the conveyor elements of automated conveying systems. As a result such automated conveying systems are able to handle the dolly 10 in this configuration.

Moreover, with the skirt elements 24 in the second position the first brake members 60 are engaged with the support surface 16, and/or at least one second brake member 80 is engaged with a corresponding rotatable member 14, to inhibit movement of the dolly 10 on the support surface 16.

While the specific embodiments have been illustrated and described, numerous modifications come to mind without significantly departing from the spirit of the invention, and the scope of protection is only limited by the scope of the accompanying Claims.

The invention claimed is:

1. A dolly comprising a deck including a plurality of rotatable members secured thereto to support the deck relative to a support surface and enable the dolly to move on the support surface, each rotatable member having a skirt element located adjacent thereto, the or each skirt element being movable relative to the deck between a first position in which each rotatable member projects in a vertical direction beyond the adjacent skirt element to a first extent and a second position in which each rotatable member projects in a vertical direction beyond the adjacent skirt element to a second extent, the second extent being less than the first extent, each rotatable member lying at least partially within the adjacent skirt element in each of the first and second positions, and movement of the or each skirt element between the first and second positions selectively activating a brake to inhibit movement of the dolly relative to the support surface.

2. A dolly according to claim 1 wherein movement of the or each skirt element from the first position to the second position activates the brake to inhibit movement of the dolly relative to the support surface.

3. A dolly according to claim 2 wherein each rotatable member has a discrete skirt element associated therewith.

4. A dolly according to claim 3 wherein each discrete skirt element defines a sleeve extending around the corresponding rotatable member.

5. A dolly according to claim 4 wherein at least two adjacent skirt elements are interconnected by a skid member.

6. A dolly according to claim 5 wherein two pairs of adjacent skirt elements are interconnected by a skid member.

7. A dolly according to claim 6 further including an actuator to move the or each skirt element between the first and second positions.

8. A dolly according to claim 7 wherein the brake includes a brake member coupled with a skirt element to engage with the support surface.

9. A dolly according to claim 8 wherein the brake member is movable relative to the skirt element.

10. A dolly according to claim 9 wherein the brake member is biased relative to the skirt element so as to protrude relative thereto.

11. A dolly according to claim 10 wherein the brake member is resiliently deformable.

12. A dolly according to claim 11 wherein the brake member is or includes a rubber bung.

13. A dolly according to claim 12 wherein the brake member is coupled with a skid member.

14. A dolly according to claim 13 wherein the brake includes a plurality of brake members, each coupled with a skid member.

15. A dolly according to claim 1 wherein the brake includes a brake member coupled with a skirt element to engage an adjacent rotatable member.

16. A dolly according to claim 15 wherein the brake member is annular.

17. A dolly according to claim 16 wherein the brake member is resiliently deformable.

18. A dolly according to claim 17 wherein the brake member is or includes rubber.

19. A dolly according to claim 18 wherein two or more discrete skirt elements includes a brake member coupled therewith.

* * * * *